United States Patent [19]

Clark et al.

[11] Patent Number: 4,723,307

[45] Date of Patent: Feb. 2, 1988

[54] SIMPLIFIED PHASE-CONTROLLED TELEVISION BROADCAST SWITCHING CIRCUIT AND THREE-POSITION COAXIAL LC PHASE SHIFTER THEREFOR

[75] Inventors: Raymond N. Clark, Camden County; Anthony N. Schmitz, Burlington County, both of N.J.

[73] Assignee: General Signal Corporation, Stamford, Conn.

[21] Appl. No.: 824,785

[22] Filed: Jan. 31, 1986

[51] Int. Cl.⁴ .......................... H04B 1/04; H04N 5/38
[52] U.S. Cl. .................................. 455/103; 455/129; 358/186; 333/109
[58] Field of Search ................ 455/103, 129; 358/186; 370/37; 333/101, 109, 160, 263

[56] References Cited

U.S. PATENT DOCUMENTS

| | | |
|---|---|---|
| 2,437,067 | 3/1948 | Bingley . |
| 2,440,269 | 4/1948 | Hargrove . |
| 2,774,044 | 12/1956 | Silvey et al. . |
| 4,451,832 | 5/1984 | Stites ................... 455/129 |
| 4,491,871 | 1/1985 | Schmitz et al. . |
| 4,602,227 | 7/1986 | Clark et al. ............ 333/109 |
| 4,623,921 | 11/1986 | Schmitz et al. ......... 358/186 |

OTHER PUBLICATIONS

"Produce Improvement Bulletin", by Harris Corporation.
English-Language Translation of a 1982 NHK Technical Report, NHK 8-2-82, entitled "A Crossover-Type System for Switching 10-kw VHF Television Broadcasting Transmitters".
Report ITEJ 10-4-82, entitled "A 10-kw VHF Transmitter Using a Continuous Change-Over Switch".
"Principles of Radar" by Reintjes and Coate, published 1962 by McGraw-Hill, pp. 635-636.
"Microwave Engineering" by A. F. Harvey, published in 1963 by Academic Press, pp. 107-115.

Primary Examiner—Jin F. Ng
Attorney, Agent, or Firm—Robert R. Hubbard; Harold Huberfeld; Jeffrey S. Mednick

[57] ABSTRACT

A noncontact switch couples power from A and B radio frequency sources to a load and an antenna in three modes. Mode I couples the A source to the antenna and the B source to the load; Mode III is B to antenna and A to load, and Mode II couples both A and B sources to the antenna. The structure includes a first 3dB, 90° coupler coupled to the sources and a second 3db, 90° coupler coupled to the load and the antenna. A third 3dB, 90° coupler is coupled in a first path between the first and second couplers. A pair of reflective terminations coupled to ports of the third coupler are mechanically controllable to one of three phase-shift conditions; 0° for mode I, 90° for mode II and 180° for mode III. A fixed phase shifter couples the first and second 3dB, 90° couplers by a second path. Each reflective phase shifter is a coaxial circuit including the parallel combination of first and second series inductance-capacitance circuits. A gap in the hollow center conductor is used to provide the capacitance. A conductive slug sliding in the hollow controls the capacitance.

21 Claims, 12 Drawing Figures

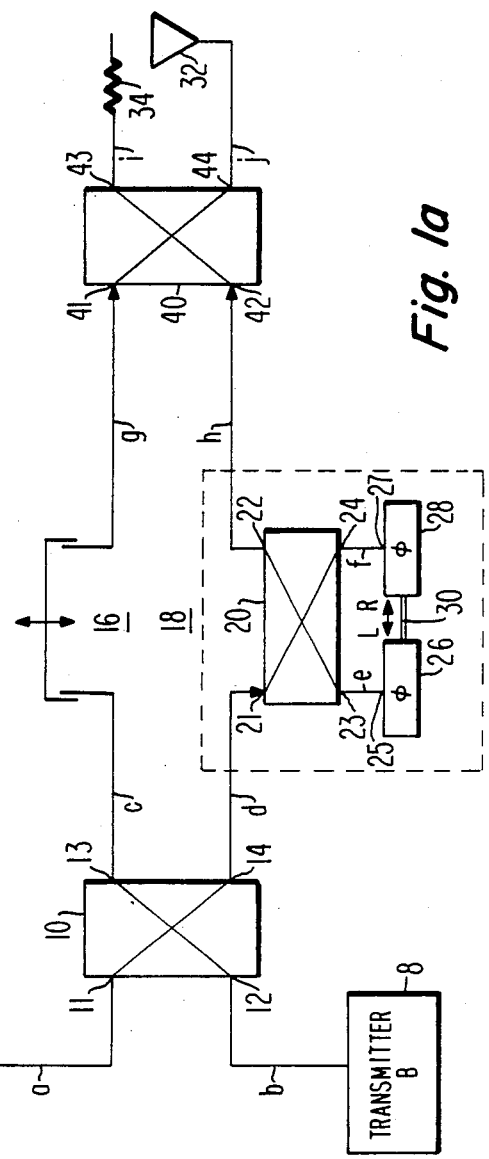

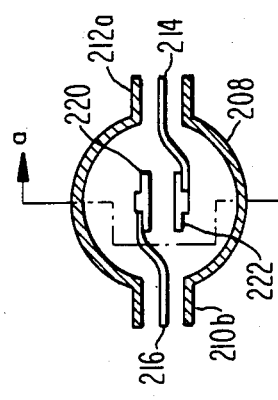
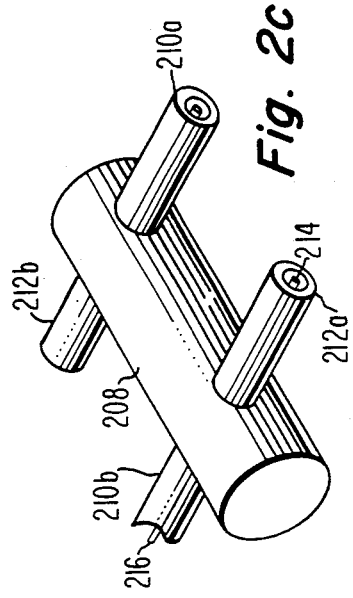
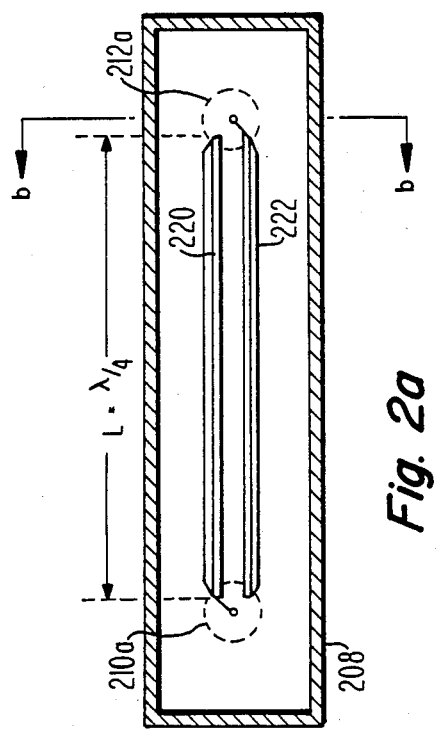

| COLUMN | 1 | 2 | 3 | 4 | 5 | 6 | 7 | 8 | 9 |
|---|---|---|---|---|---|---|---|---|---|
| | | | | PHASE SHIFT | | | | | |
| MODE | COND. a COND. b | c d | 16 20 | $\phi$ 26,28 | 16 TOTAL 18 TOTAL | g h | i j | i j | LOAD ANTENNA |
| I<br>A TO ANT.<br>B TO LOAD | A $\lfloor 0°$<br>B $\lfloor 0°$ | A $\lfloor 0°$ B $\lfloor 90°$<br>A $\lfloor 90°$ B $\lfloor 0°$ | 90°<br>90° | —<br>0° | 90°<br>90° | A$\lfloor 90°$ B$\lfloor 180°$<br>A$\lfloor 180°$ B$\lfloor 90°$ | A$\lfloor 90°$ B$\lfloor 180°$ + A$\lfloor 270°$ B$\lfloor 180°$<br>A$\lfloor 180°$ B$\lfloor 270°$ + A$\lfloor 180°$ B$\lfloor 90°$ | B$\lfloor 180°$<br>A$\lfloor 180°$ | B<br>A |
| II<br>A + B TO<br>ANTENNA | A $\lfloor 0°$<br>B $\lfloor 0°$ | A $\lfloor 0°$ B $\lfloor 90°$<br>A $\lfloor 90°$ B $\lfloor 0°$ | 90°<br>90° | —<br>90° | 90°<br>180° | A$\lfloor 90°$ B$\lfloor 180°$<br>A$\lfloor 270°$ B$\lfloor 180°$ | A$\lfloor 90°$ B$\lfloor 180°$ + A$\lfloor 0°$ B$\lfloor 270°$<br>A$\lfloor 180°$ B$\lfloor 270°$ + A$\lfloor 270°$ B$\lfloor 180°$ | A$\lfloor 45°$ B$\lfloor 225°$<br>A$\lfloor 225°$ B$\lfloor 225°$ | —<br>A+B |
| III<br>B TO ANT.<br>A TO LOAD | A $\lfloor 0°$<br>B $\lfloor 0°$ | A $\lfloor 0°$ B $\lfloor 90°$<br>A $\lfloor 90°$ B $\lfloor 0°$ | 90°<br>90° | —<br>180° | 90°<br>270° | A$\lfloor 90°$ B$\lfloor 180°$<br>A$\lfloor 0°$ B$\lfloor 270°$ | A$\lfloor 90°$ B$\lfloor 180°$ + A$\lfloor 90°$ B$\lfloor 0°$<br>A$\lfloor 180°$ B$\lfloor 270°$ + A$\lfloor 0°$ B$\lfloor 270°$ | A$\lfloor 90°$<br>B$\lfloor 270°$ | A<br>B |

*Fig. 3a*

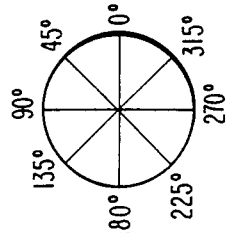

*Fig. 3b*

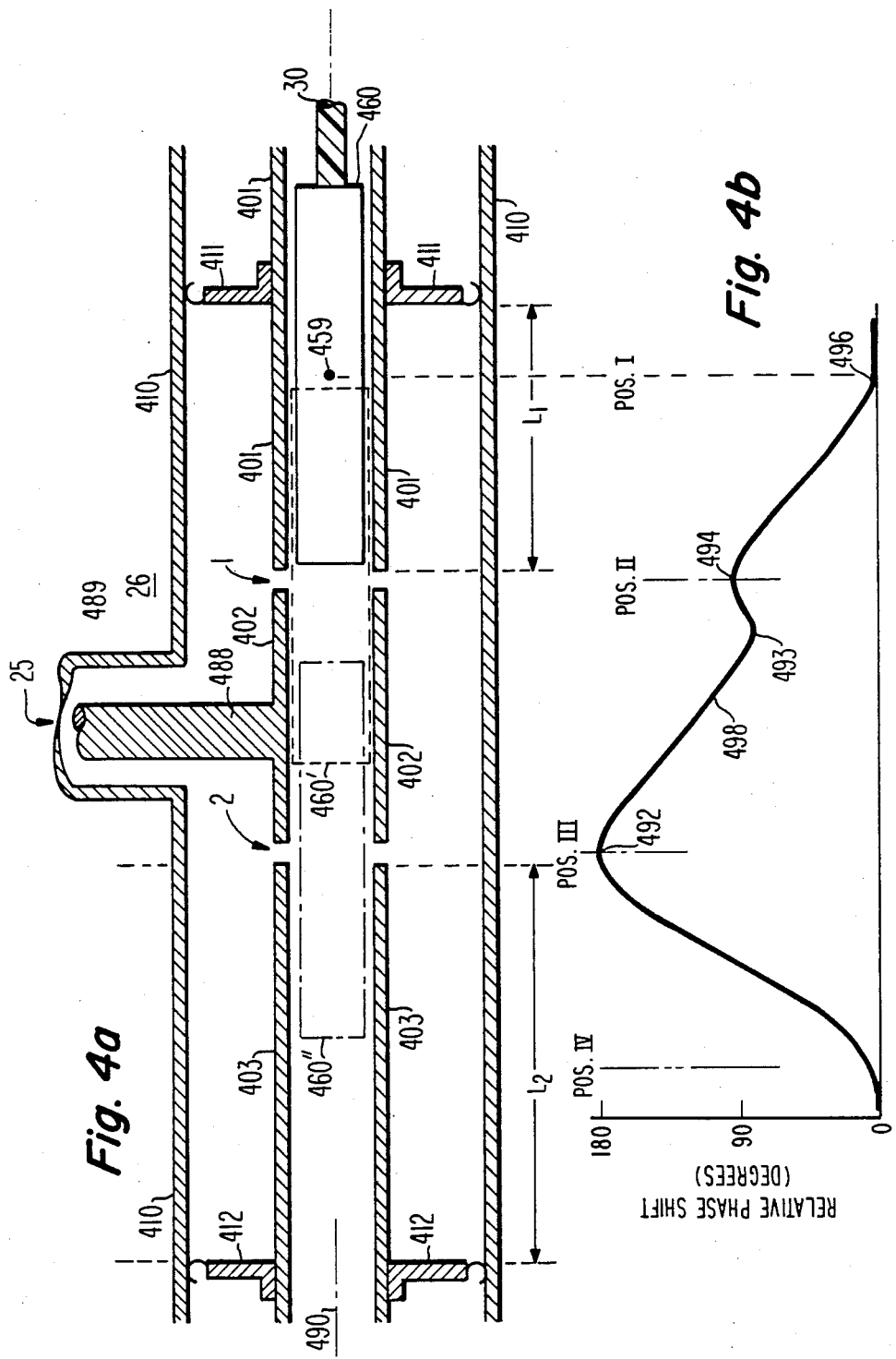

SIMPLIFIED PHASE-CONTROLLED TELEVISION BROADCAST SWITCHING CIRCUIT AND THREE-POSITION COAXIAL LC PHASE SHIFTER THEREFOR

FIELD OF THE INVENTION

This invention relates to television broadcast transmitters and particularly to simplified noncontact arrangements for switching a plurality of high power signal sources to a plurality of load circuits by the use of three-position coaxial inductance-capacitance (LC) phase shifters.

BACKGROUND OF THE INVENTION

Television broadcasters supply television signals to an antenna for broadcasting television signals to the public. Very often, the income of a television broadcaster depends upon fees charged to advertisers who desire to reach the public with their messages. In order to maximize his income, a broadcaster attempts to maximize the number of members of the public capable of receiving his signal. He may do this by increasing the gain of his antenna and the height of the antenna above the surrounding terrain so as to increase the line-of-sight distance to the horizon to reach more distant viewers. He may also choose to couple the maximum possible television signal power to the antenna, and to keep the broadcasting station operating under all conditions. One way to increase the signal power coupled to the antenna is to install a single large transmitter or power amplifier and its ancillary equipment, and to couple this single transmitter to the antenna. This has the disadvantages that routine maintenance to the transmitter may require down-time (time in which the transmitter is not operating), and similarly a failure of the single transmitter renders the broadcasting station inoperative. It is also known to use two transmitters or high power amplifiers in parallel and to couple the power from each of the transmitters to the antenna. This has the advantage of improved reliability, in that operation at reduced power continues if one of the transmitters fails, and further has the advantage that a given output power can be achieved by the use of a plurality of inexpensive low power output stages rather than by means of a single expensive high power unit.

It is often necessary to operate a transmitter into a dummy load in order to perform tests or for alignment, and signal switching is therefore necessary. Motor-driven contactors (relays) may be used for switching in order to couple one of two transmitters to an antenna, while the other transmitter is maintained in a standby condition in case the on-line (operating) transmitter should fail or in the event that routine maintenance is required. If has been found, however, that it is disadvantageous to use contactors for switching the output of the transmitter from an antenna to a load or from a load to an antenna while the transmitter is in full operation, because of various problems related to arcing at the contactor and changes in transmission line impedance while the contactors are operating, which may cause high voltages to appear at the output of the transmitter. When contactors are used to switch the output of a transmitter, it is common to shut down or inactive the transmitter by removing the energizing voltage therefrom before the contactor is operated to switch the output circuit. This mode of operation, however, is very disadvantageous to a broadcaster who does not wish to have any broadcast down-time, since it may take several seconds to shut down the operating transmitter, operate the motor drive to the motor contactor, and start up the substitute transmitter.

In order to allow switching of the transmitter output while energized, phase-shift controlled switching has been developed. Generally speaking, an arrangement for such switching includes directional or hybrid coupling circuits for combining the outputs of two transmitters and for coupling them by way of two paths to a further hybrid having one output coupled to the antenna and another coupled to a dummy load. Each of the two paths includes a controllable phase shifter, each phase shifter of which includes a further hybrid circuit and controllable reactive terminations. Such an arrangement allows both transmitters to be operated simultaneously and allows the signals to be switched between the antenna and the load without the switching of contacts and without deenergizing the transmitters. Instead, the switching is accomplished by selective control of the reactive terminations associated with the circuit. Control of the reactances causes the signals arriving at the antenna or at the load by the two paths to be either in-phase and therefore add, or to be out of phase and therefore cancel. The aforementioned phase shift controlled switching eliminates the problems associated with contactors, but may have undesirable characteristics if motorized vacuum capacitors are used for the reactive terminations. Ordinary motorized vacuum capacitors are relatively slow in operation, because of the screw drives required to maintain vacuum integrity. Thus, the change in phase which is required in order to effect switching may take several seconds, notwithstanding that the transmitters need not be deenergized during the switching. Also, the motor drives and motor drive control circuits for vacuum capacitors must be made with great precision, for a slight error in the resting position of the motor driven capacitor at either extreme of operation may result in incorrect values of terminating reactance and corresponding incorrect phase shift. Since switching of a signal away from an output port is accomplished by cancellation of two oppositely-phased signals, slightly incorrect phase in a path to the cancellation point may result in failure to cancel, which in turn results in undesired crosstalk (insufficient isolation) between signals at the loads. Furthermore, vacuum capacitors are expensive, subject to a failure mode in which the vacuum seal is lost, and may not be available in the combinations of capacitance values and power-handling capability which are desired for broadcast transmitter use. Vacuum capacitors may also have power-dissipation problems resulting from the high current flows at high power levels, because the vacuum prevents convection cooling of the capacitor plates.

It is possible to substitute a coaxial variable inductance-capacitance circuit for the vacuum capacitor of the prior art. Such a coaxial variable inductance-capacitance circuit includes a series coaxial capacitance formed by a hollow inner conductor having a gap which is centered in a coaxial inner conductor. An insulated conductive slug is located within the hollow center conductor and is moveable between a position straddling the gap and a position remote from the gap for varying the capacitance across the gap. A series inductance trims the capacitance. This arrangement is very advantageous by comparison with the vacuum capacitor, because the rate of change of reactance at positions in which the conductive slug straddles the gap and is remote from the gap is essentially zero, and therefore the reactance is substantially independent of the precise position of the conductive slug. This arrangement has the further advantage that the actuators for the capacitors do not require precision alignment and maintenance, and convection or forced-air cooling may be used. While this switching arrangement is very advantageous, its size may present packaging problems at frequencies corresponding to low VHF television channels (54 to 88 MHz), because four hybrid or directional couplers and two independently actuated sets of reactive terminations are required, each set including a pair of simultaneously actuated coaxial inductance-capacitance circuits.

It is desirable to provide contactless switching among sources and loads by means of a simplified apparatus, while maintaining the advantages of coaxial inductance-capacitance circuits.

SUMMARY OF THE INVENTION

A method and apparatus for noncontact switching of signals from first and second sources individually to first and second loads in first and second modes of operation, and for combining the first and second signals from the first and second sources and applying the resulting combined signal to one of the first and second loads in a third mode of operation includes a first coupler including four ports, the first and second which are input ports coupled to the first and second sources, respectively. The first coupler produces at a first output port the sum of the first signal and a relatively phase shifted second signal, and also produces at a second output port the second signal with a relatively phase shifted first signal. A second coupler similar to the first includes first and second input ports arranged for receiving sum signals, and further includes a first output port connected to the first load and a second output port connected to the second load. A phase shifting arrangement is coupled to the output ports of the first coupler and to the input ports of the second coupler for coupling the sum signals therebetween. The sum signal from the first output port of the first coupler is coupled to the first input port of the second coupler with a fixed phase shift. A controllable phase shifter is coupled to the second output port of the first coupler and to the second input port of the second coupler for coupling signals therebetween with a phase shift which is selectable to a reference value, to a reference value plus 90°, and to the reference value plus 180°. At the reference value of phase shift, the sum signals coupled to the first and second input ports of the second coupler are in phase. In a particularly advantageous embodiment of the invention, the phase shift is provided by a pair of three-position coaxial phase shifters coupled to ports of a third 90° coupler which is part of the controllable phase shifting arrangement. Each coaxial phase shifter includes an elongated outer conductor and first, second and third axially aligned hollow coaxial center conductor portions, spaced apart to define first and second gaps. The signal is coupled to the second center conductor portion, and the first and third center conductor portions are short-circuited to the outer conductor at positions remote from the gaps. A conductive slug slides within the hollow center conductors and assumes positions remote from either of the gaps, straddling the first gap, and straddling the second gap.

DESCRIPTION OF THE DRAWING

FIG. 1a is a block diagram of a broadcasting system according to the invention for switching signals from first and second sources to a load or to an antenna, or for combining the signals from the sources for delivery to the antenna in three different modes of operation, and FIG. 1b tabulates the function, the corresponding mode and the phase shift ($\Phi$) attributable to the phase shifters in the various modes;

FIGS. 2a and 2b are sectional views of a 3 dB coupler which is illustrated in perspective view in FIG. 2c and which is useful in the arrangement of FIG. 1a;

FIG. 3a tabulates the relative phases of various signals occurring in the arrangement of FIG. 1a in the various modes of operation, and FIG. 3b illustrates various phase angles for ready reference;

FIG. 4a is a simplified cross-sectional view of a reactive termination or phase shifter including a sliding conductive slug to an embodiment of the invention, and FIG. 4b is a plot of phase shift as a function of slug position;

FIG. 5b is an an exploded view of the arrangement of FIG. 5a.

DESCRIPTION OF THE INVENTION

Figure 5B:
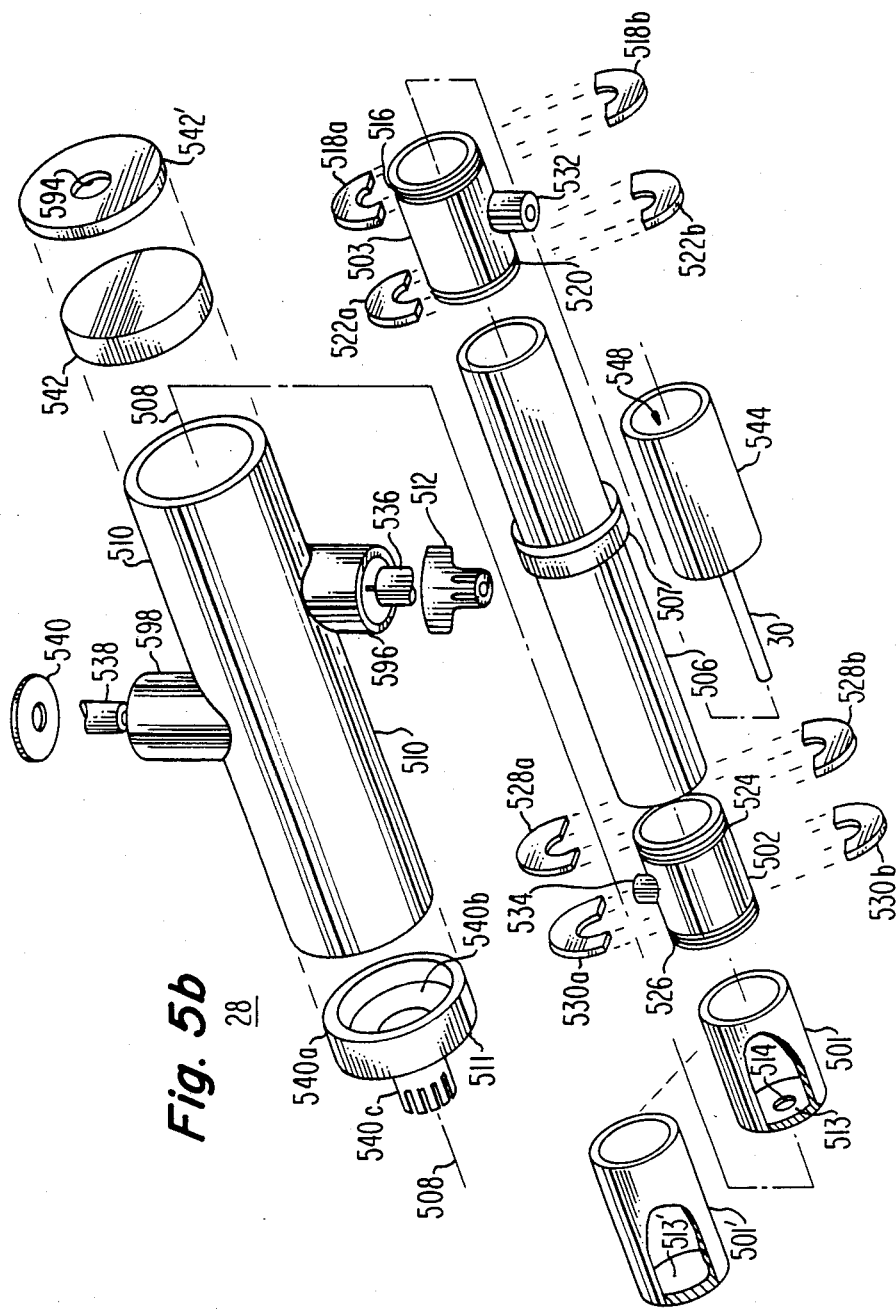

Generally speaking, the arrangement of FIG. 1 includes a first (A) and second (B) power amplifiers or transmitters, the A and B output signals, respectively, of which are coupled to a first 3dB directional coupler or hybrid 10. Coupler 10 couples half the signal ($-3$ dB) applied at each input port 11, 12 to each output port 13, 14. That half of the signal coupled to the output port adjacent the input port is not phase shifted, whereas that half of the input signal appearing at an output port by means of a transmission line (each of which is illustrated by one of the crossed lines within coupler 10) are phase shifted by 90°, which represents a quarter-wave length of the transmission line at the operating frequency. Thus, each of the two output signals from coupler 10 is the sum of a non-phase-shifted first input signal plus a 90°-phase shifted second second input signal. These two sum signals, which appear at output terminals 13 and 14 of coupler 10, are coupled by way of conductors c and d to a pair of phase shifters designated generally as 16 and 18. Phase shifter 16 is adjusted during initial set up of the equipment and remains fixed during normal operation. Phase shifter 18 is variable, and assumes one of three states in order to provide three separate modes of operation of the overall arrangement of the broadcast system of FIG. 1a. The signals phase shifted by phase shifters 16 and 18 are applied over conductors g and h, respectively, to input ports 41 and 42 of a further 3 dB coupler 40. The phase shifts of the signals on conductors g and h are selected and controlled by phase shifters 16 and 18 so that when operated upon by coupler 40 in the same manner as by coupler 10, the output signals on conductors i and j for application to a load and to an antenna, respectively, cancel or add, as the case may be, in order to accomplished the desired switching. Phase shifter 16 may be an ordinary trombone type phase shifter. Phase shifter 18 includes a further 3 dB coupler 20 and a pair of controllable phase shifters or reactive terminations 26, 28.

Each 3 dB directional coupler or hybrid of FIG. 1a is constructed as illustrated in cross-section in FIGS. 2a and 2b, and as illustrated in perspective view in FIG. 2c. The coupler illustrated in FIGS. 2a-2c includes two coaxial transmission lines 210a, 210b; 212a, 212b which are coupled together in a region enclosed by a common outer conductor 208. The center conductors, such as center conductors 214 and 216 of the coaxial transmission lines 210, 212 are connected to off-center transmission line conductor portions 220, 222. Conductor portions 220 and 222 are elongated generally flat conductors spaced apart in a parallel configuration extending longitudinally within and near the axis of cylindrical outer conductor 208. The spacing of conductors 220 and 222 is selected to provide capacitive and magnetic coupling over a distance of approximately one-quarter wavelength at the frequency of operation, for providing a directional coupling characteristic as known in the art. The characteristics of directional couplers and hybrid junctions are described at pages 107, 115 in the text "Microwave Engineering", by A. F. Harvey, published in 1963 by Academic Press.

In FIG. 1a, an A transmitter or high power amplifier 6 and a B transmitter or high power amplifier 8 produce high power A and B television signals on conductors a and b, respectively. These signals may each be, for example, 30 kW (kilowatts) within the VHF low-band television range (54–88 MHz). The signals on conductor or transmission line a are coupled to an input port 11 of 3 dB coupler 10. It should be noted that for operation at the described frequencies, transmission lines are used for carrying signals. For simplicity, these transmission lines are hereafter described as conductors. The signal from transmitter B is applied to a second input port 12 of 3 dB coupler 10 by way of a conductor b. As will be described, for operation in modes I and III, transmitters A and B need not be phase coherent, but operation in mode II requires that they be phase coherent. Methods for achieving phase coherence among sources are well known and are not part of the invention. A first output signal consisting of the sum of −3 dB or half-power A signal with 0° phase shift (A/2∠0°) and half-power 90° phase shifted B signal (B/2∠90°) is taken from a third port 13 of coupler 10 for application by way of conductor c to fixed phase shifter 16. The signal taken from fourth port 14 of coupler 10 over a conductor d is the sum of half-amplitude B signal without additional phase shift (B/2∠0°) plus half-amplitude A signal delayed or phase shifted by 90° (A/2∠90°) which is applied by way of conductor d to a first input port 21 of a 3 dB coupler 20 of phase shifter 18. It should be noted that the phase shifts described in conjunction with the 3 dB couplers are nominal values, and it is understood that there are residual undesired phase shifts which may deviate from the nominal values because of bandwidth limitations of the couplers or because of unavoidable mechanical tolerances.

As so far described, the signal on conductor c is the sum of A/2∠0° plus B/2∠90°, and the signal on conductor d is A/2∠90° plus B/2∠0°. In FIG. 3 and throughout the remainder of the description of the invention, the relative amplitudes of the signals will not be specified since they are apparent to those skilled in the art. The sum signals on conductors c and d are therefore referred to as A∠0°B∠90° and A∠90°B∠0°, respectively. The sum signal applied to input port 21 of coupler 20 is coupled without phase shift to output port 23, and is coupled by a conductor e to the input port 25 of reactive termination 26. The signal is reflected with one of three preselected phase angles by reactive termination 26. The signal reflected by termination 26 is applied over conductor e as an input signal to port 23 of coupler 20 and is coupled with a further 90° phase shift to output port 22. Thus, that portion of the signal coupled from input port 21 of coupler 20 to output port 22 appears at port 22 with a phase shift which is the sum of 90° plus the phase shift imparted by reactive termination 26. A second portion of the input signal applied to input port 21 of coupler 20 is coupled along a transmission line internal to coupler 20 to an output port 24 with a 90° phase shift. The signal leaving port 24 is applied over conductor f to a reactive termination 28, and is reflected and reapplied to port 24 with a phase shift established by the reactance of termination 28. As will be described, the reactances of terminations 26 and 28 are substantially equal. The reflected phase shifted signal applied to port 24 is coupled with 0° phase shift to output port 22 to be added to that portion reflected from reactive termination 26. Thus, the second portion of the signal applied to port 21 of coupler 20 is coupled to port 22 with a phase shift of 90° plus the phase shift attributable to reactive termination 28. Those portions of the reflected signals reflected from terminations 26 and 28 to ports 23 and 24 of coupler 20 cancel at port 21, so all the signal power entering port 21 from conductor d exits from port 22. In summary, the signal applied to input port 21 of coupler 20 is coupled to port 22 by two paths, each having a phase shift of 90° plus the phase shift of the reactive termination. Since the reactive terminations are maintained at equal reactances, the phase shift imparted to the signal by either path through coupler 20 is identical.

Reactive terminations 26 and 28 are substantially identical and are actuated together by means illustrated by a rod 30, so that each presents the same reactance to its associated output port 23, 24. As described below, reactive terminations 26 and 28 may be set to reflect signals with a relative phase of 0°, 90°, or 180°. Thus, the corresponding phase shifts between terminals 21 and 22 of coupler 20 are 90°, 180° and 270°, respectively. During initial setup, trombone phase shifter 16 is adjusted to a phase shift which equals the phase shift which occurs between ports 21 and 22 of coupler 20 with reactive terminations 26 and 28 set to the 0° phase shift condition. In a balanced system such as the system of FIG. 1a, only the difference in phase shift between the paths through phase shifters 16, 18 is relevant, rather than the absolute phase of either path. When the system is properly adjusted, the phases of the signals on conductors g and h are substantially identical when reactive terminations 26 and 28 are set to their 0° phase shift condition. With such an adjustment, the fixed 90° phase shift imparted by coupler 20 is compensated for by the setting of trombone phase shifter 16, so that the relative phase shifts of the signals on conductors g and h are established only by the settings of reactive terminations 26 and 28. The relatively phase shifted signals produced on conductors g and h are applied to input terminals 41 and 42, respectively, of directional coupler 40. Half the signal arriving at port 41 by way of conductor g is coupled without phase shift to output port 43 of coupler 40, and the other half is coupled with a further 90° phase shift to output port 44. Similarly, half the signal applied over conductor h to input port 42 of coupler 40 is coupled without phase shift to output port 44, and the other half is applied with an additional 90° phase shift to output port 43. FIG. 3 tabulates the phase shifts on conductors a through j for the various operating modes. For the sake of simplicity the modes are designated by Roman numerals as follows:

I. A to antenna, B to load
II. A plus B to antenna
III. A to load, B to antenna

For each mode tabulated in FIG. 3a, each column shows two values, one in the upper part and one in the lower part of each individual intersection of a row and column. These correspond to the values of the signals on the conductors designated by the upper and lower portions of the column headings. Referring now to column 1 of FIG. 3a, it will be noted that conductor a carries a signal of $A\angle 0°$ for operating modes I, II and III, conductor b carries a signal of $B\angle 0°$ in all operating modes. Similarly, it can be seen from column 2 that for all operating modes conductor c carries a signal $A\angle 0°$-$B\angle 90°$, and conductor d carries a signal $A\angle 90°B\angle 0°$. Column 3 indicates that for all modes, phase shifter 16 provides a phase shift of 90°, and similarly for all operating modes coupler 20 provides a phase shift of 90° between ports 21 and 22. Column 4 indicates that for mode I, phase shift $\Phi$ provided by each of phase shifters 26 and 28 is 0°, for mode II phase shift $\Phi$ is 90°, and for mode III phase shift $\Phi$ is 180°. From column 5, the total phase shift of phase shifter 18 in mode I is 90°, which is the sum of the values from columns 3 and 4. Similarly, from column 5 the total phase shift attributable to phase shifter 18 is 180° in mode II, which is the sum of the values from columns 3 and 4. In mode III, the total phase shift of phase shifter 18 is the sum of 90° (column 3) and 180° (from column 4) for total of 270°. The nominal phase shift of phase shifter 16 (90°) is indicated in column 5 for reference purposes.

Column 6 tabulates the signals on conductors g and h, which are obtained from the values in column 2 modified by the phase shift indicated in column 5. Thus, for mode I the signal on conductor g of column 6 is obtained by adding to the sum signal $A\angle 0°$ $B\angle 90°$ a 90° phase shift, to obtain $A\angle 90$ $B\angle 180°$. Similarly, the h signal is $A\angle 180°$ $B\angle 90°$, which is obtained by adding 90° to the $A\angle 90°$ $B\angle 0°$ value from column 2. Column 7 lists the signals on conductors i and j, which is derived from the values of column 6 with additional appropriate phase shifts. For example, in mode I the signal on conductor i is the signal on conductor h as listed in column 6 further phase shifted by 90°, plus the non-phase-shifted signal from conductor g as listed in column 6. Thus, the signal on conductor i is $A\angle 90°$ $B\angle 180°$ plus $A\angle 270°$ $B\angle 180°$ as tabulated in column 7. Reference to FIG. 3b shows that the 90° and 270° phases of the A signal are opposite, and the A component therefore cancels. Both the components of the B signal on conductor i as tabulated for mode I in column 7 have a phase of 180°, and they therefore add. Column 8 tabulates the net effective signal listed in column 7. Column 9 lists the signals applied to the load and to the antenna, respectively. Continuing with mode I, from column 7 of FIG. 3a, the conductor j signal is the phase shifted signal from conductor g (column 6) plus the non-phase shifted signal from conductor h (from of Column 6), and the sum is $A\angle 180°$ $B\angle 270°$ plus $A\angle 180°$ $B\angle 90°$, as listed in column 7, which reduces to $A\angle 180°$ as listed in column 8. As indicated in column 9, in mode I the antenna receives the A signal. It should be noted that the A and B signals for mode I were not cancelled against each other, and therefore the A and B signals need not be phase coherent for mode I operation, as mentioned above.

In mode II, the signal on conductor i is indicated (in column 7) as being $A\angle 90°$ $B\angle 180°$ plus $A\angle 0°$ $B\angle 270°$, which reduces to $A\angle 45°$ $B\angle 225°$ as listed in column 8. If the A and B signals are phase coherent and in phase coincidence at the origin of the signals, they will arrive at conductor i at relative phases of 45° and 225°, which by reference to FIG. 3b can be seen to be an out-of-phase condition, whereupon the A signal cancels the B signal, and no signal is applied to the load, as indicated in column 9. Again from column 7, the signal on conductor j is $A\angle 180°$ $B\angle 270°$ plus $A\angle 270°$ $B\angle 180°$, which reduces to $A\angle 225°$ $B\angle 225°$, which is an in-phase condition, whereupon the A and B signals add at the antenna as indicated in column 9.

From the foregoing discussion and description, the conditions relating to mode III will be apparent from an examination of FIG. 3a. In mode III, the A signal is applied to the load and the B signal is applied to the antenna.

FIG. 4a is a simplified cross-sectional view of reactive termination or phase shifter 26 of FIG. 1a. In FIG. 4a, elements corresponding to those of FIG. 1a are designated by the same reference numeral. Phase shifter 26 as illustrated in FIG. 4a includes a cylindrical outer conductor 410 having an axis 490. Centered within cylindrical outer conductor 410 are three axially aligned hollow cylindrical center conductor portions 401, 402, and 403. Center conductor portion 401 is axially separated from center conductor portion 402 by a gap designated 1, and center conductor portion 402 is axially separated from center conductor portion 403 by a second axial gap 2. Port 25 of reactive termination 26 is a coaxial port including an outer conductor portion 489 which intersects an aperture in outer conductor 410 and makes contact with the edges of the aperture, and also includes a center conductor portion 488 which passes through outer conductor portion 489 and intersects center conductor portion 402 at a point between gaps 1 and 2. A first short circuit arrangement 411 is coupled to center conductor portion 401 at a location spaced from gap 1 by a distance $L_1$. The length of the center conductor portion 401 between the gap 1 and the short circuit arrangement 411, i.e., the distance $L_1$, is less than one quarter wavelength at the operating frequency. Short circuit arrangement or annular plate 411 has a portion projecting radially away from axis 490 which contacts the inside of cylindrical outer conductor 410. A second short circuit arrangement or plate 412 is connected to inner conductor portion 403 at a location remote from gap 2 by a distance $L_2$. Short circuit arrangement 412 projects radially away from center conductor portion 403 and contacts cylindrical outer conductor 410. The structure of short circuiting arrangements such as 411 and 412 is well known and needs no further description. As so far described, the structure of reactive termination 26 presents to input port 25 the electrical equivalent of the parallel combination of two series circuits; a first series circuit including the capacitance associated with gap 1 in series with an inductance attributable to short circuit arrangement 411 together with distance $L_1$, and a second series circuit including the capacitance attributable to gap 2 together with a further inductance attributable to short circuit arrangement 412 and distance $L_2$. Gaps 1 and 2 have dimensions such that their capacitance is very small at the operating frequency and the gaps therefore present a large capacitive reactance to port 25 which approximates an open circuit having a reflection coefficient of 1∠0°. Such a reflection coefficient results in a 0° phase shift of the signal reflected from port 25.

Also illustrated in FIG. 4a is an elongated conductive slug which is dimensioned to fit and slide within hollow center conductor portions 401, 402 and 403. Insulating actuating rod 30 is connected to one end of conductive slug 460 for convenience in moving slug 460 to various positions within the center conductor portions. Although not illustrated in FIG. 4a, slug 460 or the interior of the hollow center conductor portions is insulated to prevent galvanic (conductive) contact with the interior surfaces of center conductors 401, 402 or 403. In the position illustrated by solid lines in FIG. 4a, slug 460 is completely within center conductor portion 401. In this position, it has no effect on the reactance presented by the gaps to port 25. The center of conductive slug 460 is illustrated as a point 459.

FIG. 4b includes a plot or curve 498 of relative phase shift of signals reflected from port 25 of the arrangement of FIG. 4a as a function of position of conductive slug 460. The plot of FIG. 4b is dimensioned relative to FIG. 4a so that each point on the abscissa (x-axis) of the plot corresponds to a position of point 459, the center of slug 460 as illustrated in FIG. 4a. The three positions of slug 460 which are of interest are designated I, II and III, corresponding to the mode selected at that position. Thus in position I of slug 460 (the position illustrated by solid lines in FIG. 4a) the relative phase shift is 0°, as indicated by point 496 on curve 498. As illustrated in FIG. 4b, curve 498 is relatively flat near and to the right of point 496, so that positions of the center of slug 460 to the right of the position illustrated by solid lines do not affect the 0° relative phase shift attributable to the gaps. As slug 460 is pushed by actuating rod 30 to the left of the position illustrated by solid lines in FIG. 4a, the relative phase shift increases, as illustrated by curve 498. Curve 498 has a point of inflection 494, corresponding to a position of slug 460 centered around gap 1 (with point 459 centered on gap I). This position of slug 460 is illustrated by a dashed line 460' in FIG. 4a, and is designated position II. As illustrated in FIG. 4b, point 494 is a region in which curve 498 is relatively flat, thereby indicating that when slug 460 is in position II, small errors in positioning do not result in significant change in the relative phase shift. As described below, the positioning of slug 460 at position II results in a 90° phase shift. Due to the elongated shape of the slug 460 along the axis 490, small errors in positioning of slug 460 at position II where the slug 460 straddles the gap 1, do not substantially affect the magnitude of the increased capacitive reactance provided by the gap 1.

As slug 460 is pushed yet further to the left of position II, the phase shift decreases slightly to a point 493 on curve 498, and then once again increases to a peak value illustrated as 492. The value of phase shift represented by point 492 is 180°. Point 492 is also a point of inflection, and corresponds to a position of slug 460 straddling gap 2 (with center point 459 of slug 460 centered on gap 2). This position is illustrated by dot-dash line 460" in FIG. 4a, and corresponds to position III. As indicated by the flat portion of curve 498 near point of inflection 492, small changes in position of slug 460 about position III do not cause significant changes in the 180° phase shift.

It should be noted that conductive slug 460 can be pushed further to the left than position III, to a position in which it is completely within center conductor portion 403. This position is position IV. In position IV the phase shift is 0°. While it might appear that positions I and IV, each having a relative phase shift of 0°, are interchangeably usable, this is not so. In operation of a broadcast transmitter such as that of FIG. 1a, it is desirable to be able to reach the mode I condition (A to antenna, B to load) from the mode II condition (A plus B to antenna) without passing through the mode III condition (A to load, B to antenna), as would be required by use of position IV to achieve to the mode I operating condition. By the use of positions I, II and III, the system may go directly from mode II operation to either mode I or to mode III.

Figure 5A:
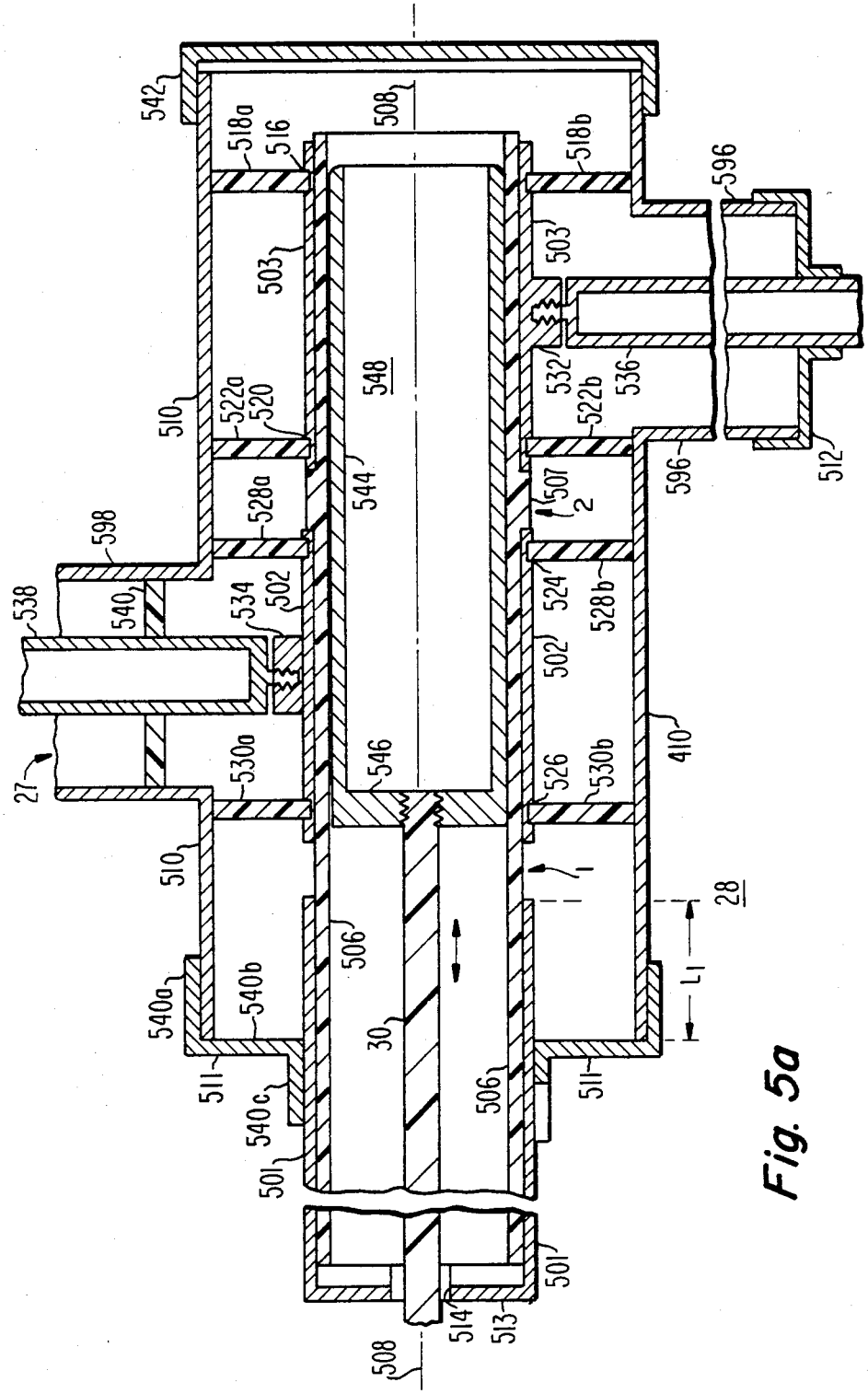
FIG. 5a is a detailed cross-sectional view of a phase shifter according to another embodiment of the invention.

FIGS. 5a and 5b are cross-sectional and exploded views, respectively, of another embodiment of a reactive termination or phase shifter which may be used in the arrangement of FIG. 1a. Elements of FIGS. 5a and 5b corresponding to those of FIG. 1a are designated by the same reference numeral. Since FIGS. 5a and 5b illustrate the same structure, they are referred to jointly as FIG. 5. In FIG. 5, phase shifter 28 includes a hollow cylindrical outer conductor 510 having an axis 508. A further outer conductor portion 598 connected to outer conductor 510 extends radially away from axis 508 to port 27. Another outer conductor portion 596 intersects outer conductor portion 510 and also extends radially away from axis 508. An elongated tube 506 formed from an insulating material is located chiefly within and coaxial with outer conductor 510. A raised annular portion 507 of insulating tube 506 is located at a point corresponding to gap 2. An elongated conductive sleeve 503 has inner dimensions selected to fit snugly over the outer diameter of tube 506 with one edge abutting annular portion 507. Another elongated conductive sleeve 502 has inner dimensions selected to fit snugly over tube 506 with one edge abutting the other side of annular portion 507. A further elongated conductive sleeve 501 closed at one end by a wall 513 has an inner diameter dimensioned to fit snugly over tube 506. Wall 513 has an aperture 514 therethrough to allow clearance for nonconductive actuating rod 30. A groove 516 is cut into one end of the outer surface of cylindrical conductive sleeve 503. A spacer in the form of a washer 518 having an inner diameter dimensioned to fit within groove 516 and an outer diameter dimensioned to fit snugly within outer conductor 510 may be split into an upper portion 518a and a lower portion 518b for ease of assembly. A similar groove 520 is cut into the other end of conductive sleeve 503. A further split spacer 522 which is split into upper and lower portions 522a and 522b fits within groove 520 and within outer conductor 510. Similarly, conductive sleeve 502 includes grooves 524 and 526 into which split spacers 528a, 528b and 530, 530b respectively, are fitted.

A cup-shaped cylindrical conductive tuning member or conductive slug 544 includes a closed wall 546 at one end and defines a hollow 548 for ease of fabrication and weight reduction. Wall 546 is drilled and tapped to receive actuating rod 30. When assembled, rod 30 and slug 544 are oriented within tube 506 with rod 30 protruding through aperture 514 in wall 513 of conductive sleeve 501 (an alternative orientation is described below). Slug 544 is movable within tube 506 to any of a number of positions, and is insulated by tube 506 from galvanic contact with any of sleeves 501, 502 or 503.

A cylindrical conductive boss 532 is attached by silver soldering or brazing to the exterior of conductive sleeve 503 at a point along its length. Similarly, a cylindrical conductive boss 534 is attached to conductive sleeve 502. Bosses 532 and 534 are each drilled and tapped for attachment of further center conductor portions. When sleeves 501, 502 and 503 are assembled onto tube 506, and the assembly is supported within outer conductor 510 by supports 518, 522, 528 and 530, sleeves 501, 502 and 503 define axially aligned center conductor portions. When so assembled, boss 532 is centered on the axis of outer conductor portion 596 and boss 534 is centered on the axis of outer conductor portion 598. With bosses 532 and 534 so oriented, further center conductor portions 536 and 538, respectively, may be attached thereto and supported as necessary by further nonconductive supports such as support 540.

As so far described, raised annular portion 507 defines gap 2. Gap 2 has a fixed dimension selected to provide a capacitance between axially aligned center conductor portions 502 and 503 which has a reactance at the frequency of operation which is large by comparison with the characteristic impedance of the structure defined by outer conductor 510 and center conductor portions 501, 502 or 503. The axial dimension of gap 1, on the other hand, is established by the axial separation between center conductor portions 501 and 502, and is adjustable. The adjustment is provided by relative axial movement between center conductor portion 501 and 502, by simply sliding sleeve 501 relative to nonconductive tube 506. A first short circuit in series with gap 1 is a short circuit arrangement illustrated as 511 which includes a conductive portion 540a which is metallurgically attached to the left end of outer conductor 510 and which includes a further conductive portion 540b extending radially towards axis 508 from portion 540a. Sliding contact of radial portion 540b with center conductor portion 501 is provided by a set of conductive spring fingers 540c which bear against the outer surface of center conductor portion 501. A conductive dust cover 542 closes off the right end of outer conductor 510.

A major advantage of the structure of FIG. 5 compared to that of FIG. 4a is its relatively small size. The small size is achieved by adjusting the characteristic impedance of the length of transmission line which connects gap 2 in series with a short circuit. As known, the reactance which a short circuit presents at the input end of a length of transmission line depends upon the characteristic impedance of the transmission line as well as upon its length. The higher the characteristic impedance, the higher the inductive reactance for a given length. When it is desired to achieve a particular value of inductive reactance, selection of a higher characteristic impedance allows the length of transmission line to be reduced. As illustrated in FIG. 5, the ratio of the diameter of inner conductor 536 relative to the inner diameter of outer conductor portion 596 is selected to provide a higher characteristic impedance than that provided by center conductor portions 501, 502 and 503 in conjunction with outer conductor 510. A short-circuit arrangement illustrated as 512 connects inner conductor 536 to outer conductor 596. The length of center conductor 536 extending between boss 532 and short-circuit 512 is therefore less than would be required for larger diameters of center conductor 536 in order to achieve the desired inductive reactance at gap 2.

Slug 544 of FIG. 5a may assume a location completely within center conductor portion 501, straddling gap 1 or straddling gap 2. In the positions in which it straddles gaps 1 or 2, it increases the magnitude of the capacitance between center conductor portions 501 and 502, or between center conductor portions 502 and 503, respectively. As in the arrangement of FIG. 4a, the length of gaps 1 and 2 is selected so that the capacitive reactance between center conductor portions in the absence of conductive slug 544 is very large, thereby causing a reflection coefficient of $1\angle 0°$ at input port 27.

The net phase shift of the signals applied at port 27 in position II (with slug 544 straddling gap 1), depends upon the difference between the inductive reactance of the inductance formed by short circuiting arrangement 511 (together with its distance $L_1$ from gap 1) and the capacitive reactance between center conductor portions 501 and 502. Either the length of gap 1 or the distance $L_1$ can be used to trim the reactance to equal the characteristic impedance of the transmission line formed by outer conductor 510 and center conductor portions 501, 502 and 503. For example, if the characteristic impedance is 50 ohms and the inductive reactance established by short-circuit arrangement 511 is about 10 ohms, the axial position of center conductor portion 501 is adjusted to cause the capacitive reactance of gap 1 equal to 60 ohms. The difference between 60 ohms and 10 ohms is 50 ohms, which equals the characteristic impedance. The reflection coefficient presented at port 27 is therefore $1\angle 90°$, which provides a 90° phase shift.

In position III (slug 544 straddling gap 2), the desired phase shift at port 27 is 180°. The dimensions of gap 2 are established by the dimensions of annular portion 507 of tube 506 and are therefore fixed. The axial dimension of gap 2 is selected to produce a capacitive reactance which is less than the characteristic impedance. The capacitance reactance at the frequency of operation may be for example 30 ohms. The position of short circuit 512 is adjusted to change its effective distance from gap 2 to provide an inductive reactance equal to the capacitive reactance (30 ohms), thereby causing a net reactance of zero, which results in a reflection coefficient of $1\angle 180°$. This provides the desired 180° phase shift.

Reflective termination 26 of FIG. 1a is similar to reflective termination 28 as illustrated in FIG. 5. However, in order to have corresponding positions of slug 544 at a given position of actuating rod 30, reflective termination 26 must have actuating rod 30 extending from the right side (as viewed in FIG. 5a) instead of the left side. For this purpose, dust cover 542 as illustrated in FIG. 5b is replaced by a dust cover illustrated as 542' which has a central aperture 594 through which actuating rod 30 can extend, and conductive sleeve 501 having aperture 514 may be replaced by conductive sleeve 501' having a solid wall 513'.

The described structure provides noncontact switching among A and B transmitters, and first and second loads by simply selecting the appropriate mechanical position of actuating rod 30. Rod 30 may be actuated manually or, if desired, may be remotely actuated by an electrical control circuit. Electrical control circuits for such purposes are well known and require no further description.

Figure 6:
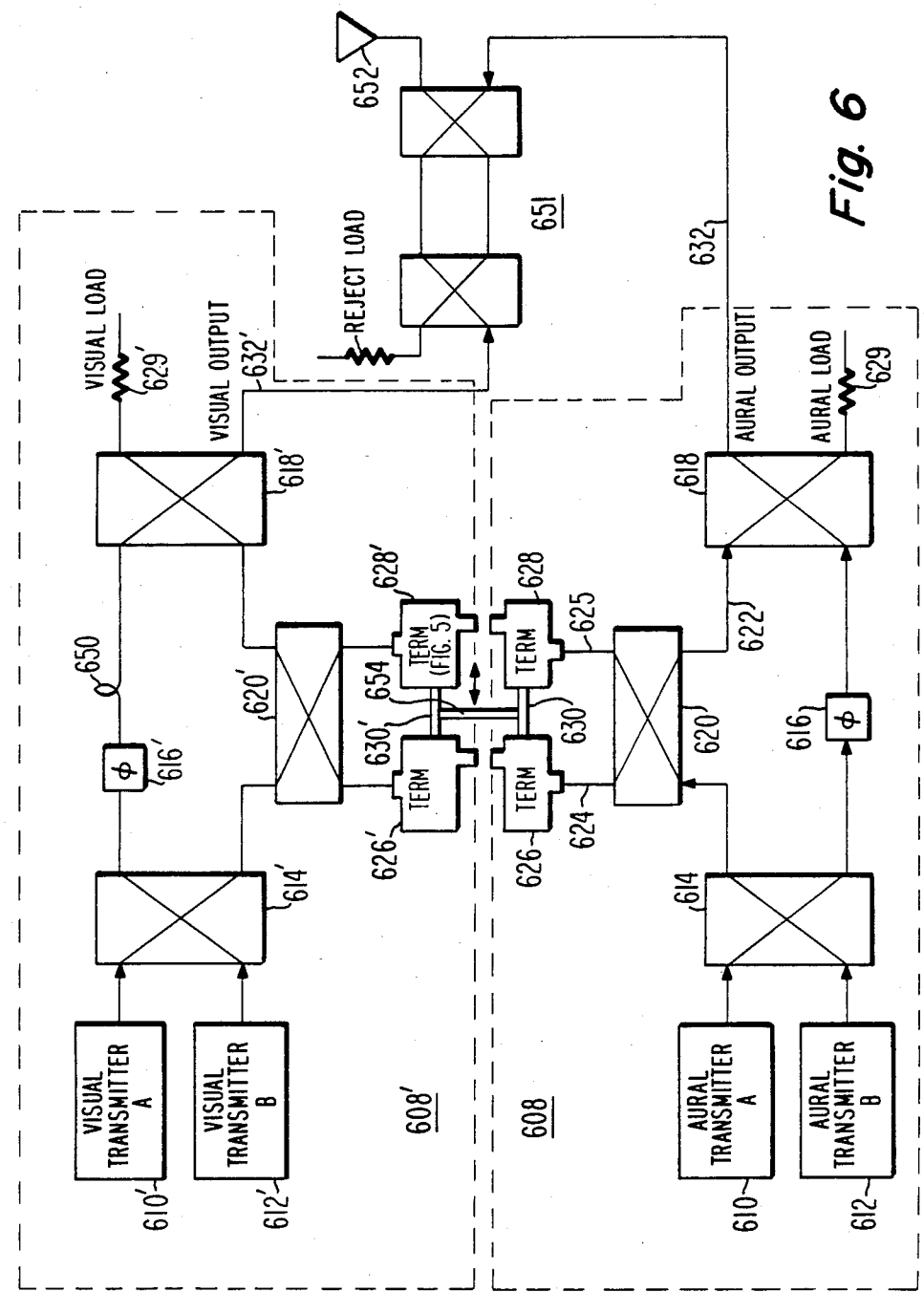
FIG. 6 is a block diagram, of a broadcast transmitter according to an embodiment of the invention having separate aural and visual transmitters.

FIG. 6 is block diagram of a broadcast system having separate aural and visual carrier sources. In FIG. 6, a noncontact switched aural generator 608 includes an aural A transmitter 610 and an aural B transmitter 612 which are connected to a 3 dB coupler 614. A first output of coupler 614 is applied by way of a fixed phase shifter 616 to an input of a second 3 dB coupler 618. A further output of 3 dB coupler 614 is applied to a third 3 dB coupler 620, the output which is coupled by way of conductor 622 to a second input of 3 dB coupler 618. Coupler 620 is connected by way of a conductor 624 to a reactive termination 626 and by way of a conductor 625 to a reactive termination 628. Terminators 626 and 628 are similar to terminations 26 and 28 of FIG. 1a and are actuated simultaneously by an actuating rod 630. A load 629 is connected to one output of coupler 618, and a selectively switched aural output signal is available on a conductor 632. As so far described, the arrangement of switched aural generator 608 corresponds to the arrangement of FIG. 1a.

Also illustrated in FIG. 6 is a switched visual generator 608'. Transmitter 608' is essentially identical with transmitter 608, and corresponding elements are designated by the same reference numerals primed. The only difference between switched visual generator 608' and switched aural generator 608 is a phase shifter 650 serially connected with phase shifter 616'. These two phase shifters are actually combined into one unit, but are shown separately for purposes of explanation. As described in conjunction with FIG. 1a, the phase shifter corresponding to 616' is set to approximately 90°, so that the signals entering coupler 618' are in-phase in mode I, corresponding to 0° reflection coefficient by terminations 626' and 628'. Phase shifter 616' of switched visual transmitter 608' is set to the same value of 90°. However, additional phase shifter 650 is set to provide an additional 180° of phase shift. This additional phase shift has the unexpected effect of broadening the bandwidth of the system. It also has the incidental effect of reversing the visual load and visual output connections of coupler 618'. Phase shifters 626, 628; 626', 628' are actuated together as suggested by connecting rod 654 which connects together actuating rods 630, 630'. The aural signal on conductor 632 and the visual signal on conductor 632' are applied to an audio-visual diplexer illustrated as 651. The diplexer may be of the type described in U.S. Pat. No. 4,491,871 issued Jan. 1, 1985, in the name of Schmitz et al. Diplexer 651 combines the aural and visual signals and applies them to an antenna 652.

What is claimed is:

1. A broadcast system for broadcasting signals modulated onto a carrier having a carrier frequency, comprising:

a first four-port 90° coupler adapted for coupling signals from a first port to a third port with a reference phase shift and from said first port to a fourth port with an additional 90° phase shift, and for coupling signals from a second port to said fourth port with said reference phase shift and from said second port to said third port with an additional 90° phase shift;

a first source of modulated carrier having said carrier frequency coupled to said first port of said first coupler for coupling first signal to said third and fourth ports of said first coupler;

a second source of modulated carrier having said carrier frequency coupled to said second port of said first coupler for coupling second signal to said third and fourth ports of said first coupler;

a second four-port 90° coupler adapted for coupling signals from a first port to a third port with a reference phase shift and from said first port to a fourth port with an additional 90° phase shift, and for coupling signals from a second port to said fourth port with said reference phase shift and from said second port to said third port with an additional 90° phase shift;

a load coupled to said third port of said second coupler;

an antenna coupled to said fourth port of said second coupler;

a third four-port 90° coupler, adapted for coupling signals from a first port to a third port with a reference phase shift and from said first port to a fourth port with an additional 90° phase shift, and for coupling signals from said fourth port to a second port with said reference phase shift and from said third port to said second port with an additional 90° phase shift, said first port of said third coupler being coupled to said fourth port of said first coupler for receiving said first and second signals therefrom for coupling said first and second signals to said third and fourth ports of said third coupler, said second port of said third coupler being coupled to said second port of said second coupler for applying to said second port of said second coupler signals applied to said third and fourth ports of said third coupler;

variable reactive phase shifting means coupled to said third and fourth ports of said third coupler for reflecting said second and third signals applied from said third and fourth ports of said third coupling means, said variable reactive means reflecting said second and third signals with a reference phase shift in a first position, said reference phase shift plus 90° in a second position, and said reference phase shift plus 180° in a third position, for phase shifting said first and second signals applied to said first input port of said third coupler to produce phase-shifted first and second signals which are applied to said third and fourth ports of said third coupler, whereby phase-shifted first and second signals are coupled by way of said second port of said third coupler to said second port of said second coupler;

second phase shifting means coupled to said third port of said first coupler and to said first port of said second coupler, for coupling said first and second signals from said third port of said first coupler to said first port of said second coupler with a phase shift equal to the phase shift imparted to said first and second signals by said third coupler and said variable reactive phase shifting means when said variable reactive phase shifting means is in said first position, whereby in said second position both said first and second signals are coupled to said antenna, and in said first and third positions only one of said first and second signals is coupled to said antenna, and the other one of said first and second signals is coupled to said load.

2. A system according to claim 1 wherein said variable reactive phase shifting means comprises:

first and second coaxial reactances, each including a signal coupling port and actuating means, said signal coupling port of said first coaxial reactance being coupled to said third port of said third coupler for receiving a first portion of said first and second signals therefrom and for reflecting said first portion of said first and second signals with a phase shift controlled by the position of said actuating means of said first coaxial reactance, said signal coupling port of said second coaxial reactance being coupled to said fourth port of said third coupler for receiving a second portion of said first and second signals therefrom and for reflecting said second portion of said first and second signals with a phase shift controlled by the position of said actuating means of said second coaxial reactance; and actuator control means coupled to said actuating means of said first and second coaxial reactances for simultaneous control thereof in said first, second and third positions.

3. A system according to claim 2 wherein each of said first and second coaxial reactances comprises:

an elongated cylindrical outer conductor having an axis;

first, second and third axially aligned elongated hollow cylindrical center conductor portions coaxial with said cylindrical outer conductor, said first and second center conductor portions being axially separated by a nonconductive first gap, thereby defining a series first coaxial capacitor having a low value first capacitance, said second and third center conductor portions being axially separated by a second gap, thereby defining a series second coaxial capacitor having a low value second capacitance;

first coaxial short-circuiting means coupled to said cylindrical outer conductor and to said first center conductor portion at a location electrically spaced from said first gap to form a first inductor in series with said first coaxial capacitor, said first inductor having a first inductance at said carrier frequency;

second coaxial short-circuiting means coupled to said cylindrical outer conductor and to said third center conductor portion at a location electrically spaced from said second gap to form a second inductor in series with said second coaxial capacitor, said second inductor having a second inductance at said carrier frequency;

an elongated conductive slug coupled for axial movement within said hollow first, second and third center conductor portions, and insulated therefrom, said conductive slug being coupled to said actuating means for being axially positioned thereby, said conductive slug straddling said first gap in said second position thereby causing said first capacitance to assume a higher value, said conductive slug straddling said second gap in said third position thereby causing said second capacitance to assume a higher value, and said conductive slug being completely within one of said first, second and third center conductor portions in said first position; and coaxial coupling means coupled to said signal coupling port, to said cylindrical outer conductor and to said second center conductor portion at a position between said first and second gaps for coupling said first and second signals to said second center conductor portion, whereby when said conductive slug is completely inside said one of said first, second and third center conductor portions said first and second signals applied to said signal coupling port are reflected with said reference phase shift, and when said conductive slug straddles one of said first and second gaps said first and second signals applied to said signal coupling port are reflected with 90° and 180° phase shifts, respectively.

4. A system according to claim 3, wherein said first, second and third axially aligned elongated hollow cylindrical center conductor portions are mounted on an insulating cylinder having an axial central bore; and said conductive slug is dimensioned to fit and slide within said axial central bore.

5. A system according to claim 4 wherein said insulating cylinder includes a raised annular portion; and said second and third center conductor portions abut said raised annular portion, which thereby defines the dimensions of said second gap.

6. A system according to claim 4 wherein at least one of said first and second coaxial short-circuiting means comprises:

a conductive annular member including a first portion fixedly coupled to said cylindrical outer conductor, a second portion slideably coupled to one of said first and third center conductor portions; and a transverse portion joining said first and second portions of said conductive annular member, said transverse portion being orthogonal to said axis.

7. A system according to claim 6 wherein said one of said first and third center conductor portions to which said second portion of said conductive annular member is slidably coupled further comprises second actuating means for controlling the axial position thereof relative to said second center conductor portion for controlling gap length.

8. A system according to claim 3 wherein said second coaxial short-circuiting means comprises:

an aperture in said cylindrical outer conductor;

an elongated fourth center conductor portion extending radially away from said axis and through said aperture in said cylindrical outer conductor, one end of said fourth center conductor portion being connected at a first end to said third center conductor portion;

a further outer conductor coaxial with said fourth center conductor portion, said further outer conductor being coupled to the edges of said aperture in said cylindrical outer conductor; and transverse conductive means connected to said further outer conductor and to said fourth center conductor portion at a position remote from said aperture in said cylindrical outer conductor.

9. A system according to claim 8 wherein:

said fourth center conductor portion is smaller in diameter than said first center conductor portion.

10. A system according to claim 9 wherein said further outer conductor is dimensioned in relation to said fourth center conductor portion to have a characteristic impedance greater than that established by said cylindrical outer conductor and any one of said first, second and third center conductor portions.

11. A system according to claim 3, wherein said cylindrical outer conductor and any one of said first, second and third center conductor portions have diameters which together define a characteristic impedance, said higher value of said first capacitance has a reactance at said carrier frequency which has a magnitude which is higher than the magnitude of said characteristic impedance, and said higher value of said second capacitance has a reactance at said carrier frequency which has a magnitude substantially lower than the magnitude of said characteristic impedance.

12. A system according to claim 11, wherein the reactance at said carrier frequency of said first inductance is equal to the difference between the magnitude of said reactance of said higher value of said first capacitance at said carrier frequency and said magnitude of said characteristic impedance.

13. A system according to claim 11, wherein said characteristic impedance is about 50 ohms, and wherein at said carrier frequency the reactance of said first inductance is about 10 ohms, the reactance of said higher value of said first capacitance is about 60 ohms, and the net reactance is also about 50 ohms, thereby providing a phase shift of about 90°.

14. A system according to claim 13, wherein at said carrier frequency said higher value of said second capacitance has a reactance of about 30 ohms, and said second inductance has a reactance of about 30 ohms, and the net reactance is about zero ohms, thereby providing a phase shift of about 180°.

15. A method for coupling among signal sources, an antenna and a load, comprising the steps of:
power dividing and mutually phase shifting the signal from a first signal source to produce a first signal having an amplitude and first reference phase and a second signal having said amplitude and said first reference phase plus 90°;
power dividing and mutually phase shifting the signal from a second signal source to produce a third signal having said amplitude and said first reference phase and a fourth signal having said amplitude and said first reference phase plus 90°;
summing together said first and fourth signals to produce a first sum signal, and summing together said second and third signal to produce a second sum signal;
power dividing and mutually phase shifting said second sum signal to produce a first incident signal having half the amplitude of said second sum signal and a third reference phase relative thereto and to produce a second incident signal having an amplitude equal to that of said first incident signal and in phase quadrature therewith;
reflecting said first and second incident signal with a selected phase to produce first and second reflected signals, respectively;
summing and mutually phase shifting said first and second reflected signals to produce a phase shifted second sum signal representing the sum of said second reflected signal with an additional third reference phase and said first reflected signal with said additional third reference phase plus 90°;
fixedly phase shifting said first sum signal to produce a phase shifted first sum signal having components of the same phase as the components of said second sum signal when said selected phase is 0°;
power dividing and mutually phase shifting said phase shifted first sum signal to produce a first load signal having half the amplitude of said first sum signal and a second reference phase relative to said first sum signal, and to produce a first antenna signal having an amplitude equal to that of said first load signal and in phase quadrature therewith;
power dividing and mutually phase shifting said phase shifted second sum signal to produce a second antenna signal having an amplitude equal to that of said first antenna signal and with an additional second reference phase, and to produce a second load signal having an amplitude equal to that of said first load signal and with said additional second reference phase plus 90° phase;
applying said first and second load signals to said load;
applying said first and second antenna signals to said antenna; and
setting said selected phase to 90° to couple said signals from said first and second sources to said antenna, setting said selected phase to 0° to couple said signal from said second source to said load and said signal from said first source to said antenna, and setting said selected phase to 180° to couple said signal from said first source to said load and said signal from said second source to said antenna.

16. An arrangement for controlling high-power, high-frequency first and second signals from first and second sources, respectively, for applying said first and second signals individually to first and second loads in first and second modes of operation, and for combining said first and second signals and applying the resulting combined signal to one of said first and second loads in a third mode of operation, said arrangement comprising:
a first coupler comprising first, second, third and fourth ports, said first and second ports being input ports coupled to said first and second sources, respectively, and said third and fourth ports being output ports, each of which produces a combination signal resulting from a combination of said first and second signals;
a second coupler comprising first and second input ports each adapted for receiving phase-shifted combination signal, and further comprising a first output port coupled to said first load and a second output port coupled to said second load;
phase shifting means coupled to said first and second couplers for fixedly coupling and phase-shifting said combination signal from said third port of said first coupler to said first input port of said second coupler and for coupling and selectively phase-shifting said combination signal from said fourth port of said first coupler to said second input port of said second second coupler, said phase shifting means comprising fixed phase shifting means coupled to said third port of said first coupler and to said first port of said second coupler for coupling phase-shifted combination signal thereto, said phase shifting means further comprising coupling means including an input port coupled to said fourth port of said first coupler for receiving said combination signal therefrom and also including an output port coupled to said second input port of said second coupler for coupling phase-shifted combination signal thereto, said coupling means further including third and fourth additional ports; and
reactive terminating means coupled to said third and fourth additional ports of said coupling means for controlling the phase shift imparted by said phase shifting means for selecting one of said first, second and third modes of operation, said reactive terminating means comprising a pair of coaxial inductance-capacitance circuits, each member of said pair of coaxial inductance-capacitance circuits being coupled to one of said third and fourth additional ports of said coupling means, each of said coaxial inductance-capacitance circuits including elongated coaxial transmission-line means including an outer conductor and an inner conductor, said inner conductor including axially aligned first, second and third portions concentric with said outer conductor, said first portion of said inner conductor being axially separated from said second portion of said inner conductor by a first non-conductive gap, and said second portion of said inner conductor being axially separated from said third portion of said inner conductor by a second non-conductive gap, and the ends of said first and third portions of said inner conductor remote from said first and second gaps, respectively, being short-circuited to said outer conductor at first and second positions.

17. An arrangement according to claim 16 wherein said first and second portions of said inner conductor are hollow at least in the region of said gap.

18. An arrangement according to claim 17 further comprising:
conductive capacitance varying means selectively located at a first position within said hollow of one of said first and second portions of said inner conductor whereby the capacitance across said gap is small and at a second position straddling said gap whereby said gap provides a larger capacitance; and
control actuating means coupled to said control means and to said conductive capacitance varying means for selecting said first position in at least one of first and second modes of operation and for selecting said second position in said third mode of operation.

19. An arrangement according to claim 18 wherein the length of said first portion of said inner conductor between said gap and said first position is less than one-quarter wavelength at said high frequency.

20. An arrangement according to claim 18 comprising control means for setting the position of said conductive capacitance varying means of said reactive terminating means to one of said first and second positions for selecting among said first, second and third modes of operation.

21. An arrangement according to claim 18 wherein said conductive capacitance varying means is elongated in the direction of said elongated coaxial transmission-line means whereby small errors in positioning said capacitance varying means in said position straddling said gap do not substantially affect the magnitude of said larger capacitance provided by said gap.

* * * * *